Patented Dec. 29, 1942

2,306,927

UNITED STATES PATENT OFFICE 2,306,927

VOLTAIC CELL

William C. Arsem, Schenectady, N. Y.

No Drawing. Application April 20, 1939,
Serial No. 269,050

4 Claims. (Cl. 136—137)

This invention relates to a new and improved type of voltaic cell comprising a novel depolarizing system.

The principle of the so-called dry cell is well known, and the construction of commercial cells is fairly well standardized. The commercial dry cell is made up as follows:

A container of zinc which serves as anode; a depolarizing assembly which serves as a cathode and is in the form of a core or bobbin made up of carbon, manganese dioxide and a solution of zinc and ammonium chlorides, this core being molded around or in contact with a carbon rod which served as a means of contact with the cathodic depolarizing assembly, and as an external electrode. The space between the cathode core and the zinc anode is filled with a paste containing zinc and ammonium chlorides and a stiffening agent such as starch.

Manganese dioxide as a depolarizer in the commercial dry cell has some drawbacks or defects which limit the life of the cell and prevent its satisfactory maintenance of voltage when operating under load. These defects are inherent, and are partly due to the extreme insolubility of manganese dioxide and of its reduction product. When the surface layers of the manganese dioxide particles have been reduced, depolarization becomes dependent on the underlying layers which are less accessible, and the depolarizing efficiency falls off rapidly.

In my improved cell, I use as a depolarizing agent a reducible organic substance having a high oxidizing potential, together with other substances which facilitate the cathodic reactions by physical and chemical action. The cathode depolarizing assembly of my cell is made up of the following elements:

a. A depolarizing agent which is an organic substance capable of electrolytic reduction.

b. An acid substance having a low ionization constant or low solubility.

c. A highly conducting form of carbon.

d. A form of carbon having a high specific surface.

e. A solution of an electrolyte.

I shall now give examples of these elements and describe their functions in the cell.

a. Organic depolarizing agents which have a sufficiently high oxidizing potential to be useful in cells are to be found particularly among substances in which the oxidizing properties are due to a grouping containing nitrogen attached to a halogen or to oxygen, although depolarizing effects can also be obtained with other reducible organic compounds.

Examples of suitable organic depolarizing agents are:

N-chloramides, such as p-toluene sulfonyl dichloramide, p-toluene sulfonyl sodio-chloramide, N-chlorbenzamide, acetchloramide.

N-chlorimides, such as N-chlorphthalimide, N-chlorsuccinimide, benzoquinonechlorimide.

And, in general, substances containing the groupings R—X—NCl$_2$, or (RX)$_2$NCl in which X is an acidic radical such as —CO— or —SO$_2$; and also substances containing Br or I in place of Cl in the above examples.

Nitro-compounds, such as alpha-nitronaphthalene, 2,4-dinitrophenol, dinitrotoluene.

Nitroso compounds, such as p-nitrosodimethylaniline.

Azoxy compounds, such as azoxybenzene, azoxytoluene.

Quinones, such as benzoquinone, chloranil.

b. The acid substance in the cathode depolarizing assembly aids in maintaining an adequate hydrogen ion concentration around the cathode, neutralizes alkali as fast as it forms and retards the formation of basic salts. Under these conditions a higher single potential is maintained at the cathode and a higher external working voltage is a characteristic of the cell. Suitable acid substances are acids of low solubility or low ionization constant such as boric acid, phthalic acid, benzoic acid, salicylic acid; acid salts such as sodium dihydrogen phosphate, sodium acid tartrate or acidic substances with suppressed acid functions such as gluconic lactone or benzidine sulfate. Substances with buffer characteristics may also be used for this purpose.

The depolarizing function and the acid function may be combined in the same substance such as nitrobenzoic acid, N-chlorsulfobenzamide or N-chlorsuccinamic acid.

c. The highly conducting form of carbon may be graphite, natural or artificial, or even a non-graphitic carbon. It may be purified by acid treatment before use. Its function is to provide an extended cathode surface of high conductivity.

d. The form of carbon having a high specific surface may be one of the several varieties of carbon black, lampblack or active carbon or a mixture containing more than one variety. Its function is to adsorb the reacting ingredients at the cathode surface or to provide an extended surface on which reactions may take place and to facilitate the cathode reactions and also to serve as an intermediate conductor. This carbon may also conceivably act as a "carrier" reacting with the depolarizing agent, to form a surface compound in which oxygen or chlorine, for example, is attached to the carbon surface, and then reacts with hydrogen ions. The use of such carbon in the depolarizing assembly causes the cell to have a longer life and to maintain a higher average voltage during its life. A molded core containing such fine carbon is more coherent and more firm than one without it. The presence of this carbon of high specific surface makes the depolarizing action nearly instantaneous and not dependent upon the slow process of diffusion.

This carbon of high specific surface may be heat-treated at a high temperature, 2000° to 3000° C., to increase its conductivity, and may, by such heat treatment, be partly or completely graphitized, while retaining a high specific surface. Such heat-treated carbon may be used in my cell to fulfill the functions of high surface and high electrical conductivity.

When carbon-black or lamp-black is heated at 2000° to 3500° C. in vacuum, it may be used in the cell without any other form of carbon. This carbon of high specific surface may be one of the commercial varieties which has been heat-treated at about 1000° C. in presence of air so that it contains loosely combined oxygen, or it may be a variety which has been heated in absence of air at the same temperature so that it contains a minimum of combined oxygen. This carbon may also be impregnated with substances such as manganese dioxide, vanadium pentoxide, silicic acid, or nickel, which will act as catalysts in reactions at the cathode surface.

*e.* The solution of electrolyte which is mixed with the ingredients of the core may contain soluble chlorides of alkali metals, alkaline earth metals, zinc, aluminum or other metals which do not deposit in the free metallic state on the cathode. Mixtures of salts may be used. Sulfates and salts with other anions may be employed. Ammonium salts should not be used when the depolarizer is a substance containing active chlorine, because volatile chloramines are formed and escape from the cell.

Although I do not wish to be limited to any particular theory, I believe that the reactions in the cell may be satisfactorily explained as follows:

At the cathode surface, in the absence of a depolarizing agent and an acid substance, sodium ions and hydrogen ions are discharged. Molecular hydrogen is formed from the hydrogen ions and also by reaction of the sodium with water, and sodium hydroxide is at the same time produced, rendering the liquid alkaline at the cathode surface. The polarization due to the hydrogen layer and to the lowered hydrogen ion concentration around the cathode cause a drop in cathode potential and a lowering of the effective cell voltage. In the presence of the depolarizing agent, the liberation of free hydrogen is prevented and the cathode reaction is the reduction of the depolarizing agent instead of the discharge of free hydrogen. The reduction takes place on the extended cathode surface on which there is an adsorbed layer of the depolarizing agent. This layer is constantly renewed by adsorption from the dilute solution which constantly forms from the solid depolarizer and the aqueous electrolyte in the core. In the presence of the acid substance in the core, the cathode liquid is prevented from becoming strongly alkaline.

N-chloramides or N-chlorimides are used as depolarizers; the amide or imide formed by reduction has acid properties and aids in maintaining a favorable hydrogen ion concentration.

The chemical reactions in the cell may be written as follows, although they do not necessarily take place separately or successively as written.

1. Dissociation and migration of ions.

$$4NaCl \rightarrow 4Na^+ \text{(to cathode)} + 4Cl^- \text{(to anode)}$$

2. Solution of zinc as Zn ions at anode.

$$2Zn - 4e = 2Zn^{++}$$

3. Discharge of sodium ions at cathode.

$$4Na^+ + 4e = 4Na$$

4. Reaction of sodium with water.

$$4Na + 4H_2O = 4NaOH + 2H_2$$

5. Oxidation of hydrogen by depolarizer. (For example, $RX-NCl_2$.)

$$RX-NCl_2 + 2H_2 = RX-NH_2 + 2HCl$$

6. Neutralization of parts of NaOH by HCl.

$$2NaOH + 2HCl = 2NaCl + 2H_2O$$

7. Neutralization of balance of NaOH by the added acidic substance.

$$2NaOH + 2H\bar{A} = 2Na\bar{A} + 2H_2O$$

8. Sum of all reactions in the cell.

$$2Zn + 2NaCl + RX-NCl_2 + 2H\bar{A} =$$
$$2Zn^{++} + 4Cl^- + 2Na\bar{A} + RX-NH_2$$

In the above example if $RX-NCl_2$ is p-toluene sulfonyl dichloramide, its reduction product, $RX-NH_2$, is p-toluene sulfonylamide.

If N-chlorphthalimide is used as the depolarizer, the sum of the cell reactions will be; representing the Zn and Cl ions as $ZnCl_2$:

9. $Zn + NaCl + RNCl + H\bar{A} = ZnCl_2 + Na\bar{A} + R:NH$

In the above equations X is an acid-forming group such as carbonyl, —CO—, or sulfuryl, —SO$_2$—. $\bar{A}$ is an acid radical of an acid, H$\bar{A}$.

If a nitro compound is used as a depolarizer, and reduction to a hydroxylamine derivative is assumed, the cell reactions would be those designated by the numbers 1, 2, 3 and 4 above, followed by 5a. $RNO_2 + 2H_2 = RNHOH + H_2O$
6a. $RNHOH + H\bar{A} = RNHOH.H\bar{A}$
7a. $4NaOH + 4HA = 4NaA + 4H_2O$
8a. Sum of cell reactions:

$$2Zn + 4NaCl + RNO_2 + 5HA = 2ZnCl_2 + RNHOH.H\bar{A} + 4Na\bar{A}$$

The following are examples of cathode depolarizing assemblies or cores which may be used in my improved cell:

*Example 1*

| | |
|---|---:|
| p-Toluene sulfonyl dichloramide___grams__ | 500 |
| Carbon black, calcined in air_____do____ | 50 |
| Artificial graphite, 200 mesh_____do____ | 1500 |
| Electrolyte solution<br>10% zinc chloride<br>20% sodium chloride }_____do____ | 1250 |

*Example 2*

| | |
|---|---:|
| p-Toluene sulfonyl dichloramide__grams__ | 500 |
| Phthalic anhydride_____do____ | 600 |
| Carbon black, calcined out of contact with air _____grams__ | 50 |
| Artificial graphite_____do____ | 950 |
| Electrolyte solution 5% sodium chloride_cc__ | 800 |

*Example 3*

| | | |
|---|---|---|
| p-Toluene sulfonyl dichloramide | grams | 500 |
| Boric acid | do | 500 |
| Carbon black, calcined out of contact with air | grams | 55 |
| Graphite, artificial | do | 1045 |
| Sodium chloride solution 5% | cc | 800 |

*Example 4*

| | | |
|---|---|---|
| p-Toluene sulfonyl dichloramide | grams | 500 |
| Boric acid | do | 500 |
| Carbon black, calcined out of contact with air | grams | 250 |
| Graphite | do | 750 |
| Sodium chloride solution | cc | 900 |

*Example 5*

| | | |
|---|---|---|
| p-Toluene sulfonyl dichloramide | grams | 1000 |
| Carbon black | do | 250 |
| Graphite | do | 750 |
| Magnesium chloride solution, 10% | cc | 900 |

*Example 6*

| | | |
|---|---|---|
| p-Toluene sulfonyl sodiochloramide | grams | 500 |
| Boric acid | do | 500 |
| Carbon black | do | 100 |
| Graphite | do | 900 |
| Sodium chloride solution, 10% | cc | 800 |

*Example 7*

| | | |
|---|---|---|
| N-chlor phthalimide | grams | 750 |
| Boric acid | do | 500 |
| Carbon black, calcined at high temperature | grams | 800 |
| Sodium chloride solution, 5% | cc | 900 |

*Example 8*

| | | |
|---|---|---|
| 2,4-dinitrophenol | grams | 180 |
| Boric acid | do | 630 |
| Carbon black | do | 120 |
| Graphite | do | 1080 |
| Sodium chloride solution, 10% | cc | 800 |

*Example 9*

| | | |
|---|---|---|
| p-Toluene sulfonyl dichloramide | grams | 700 |
| Boric acid | do | 700 |
| Carbon black | do | 100 |
| Graphite | do | 500 |
| Sodium chloride solution, 10% | cc | 800 |

In making a cathode assembly, I mix the previously pulverized solid ingredients shown in one of the examples above, and grind them together; I then add the solution of electrolyte and continue mixing until a uniform mixture is obtained. As a step in manufacture, the mixture before molding may be treated under vacuum to remove adsorbed gases which may be present in the carbon or graphite, or the materials may be vacuum treated before mixing.

The mixture prepared for molding may then be pressed in a cylindrical mold around a carbon rod cathode, or formed in other shapes for use in non-cylindrical cells.

My improved cell maintains a higher average voltage than the present commercial cells when operating on a normal load, and also has a longer useful life above .75 volt.

The following data show the performance of one of my improved cells in which the depolarizing assembly weighed 25 grams and was made in accordance with Example 3, in comparison with two commercial cells of well-known brands which I shall designate as A and B. All these cells were of the "D" size used in flashlights. They were 1¼ inches in diameter and 2¼ inches high. Each cell was connected to a resistance of 4 ohms, and the voltage across the resistance was measured at intervals.

| Minutes | Volts | | |
|---|---|---|---|
| | Improved type | Cell A | Cell B |
| 0 | 1.65 | 1.40 | 1.38 |
| 20 | 1.39 | 1.18 | 1.21 |
| 60 | 1.32 | 1.06 | 1.10 |
| 120 | 1.29 | 0.93 | 1.02 |
| 180 | 1.18 | 0.77 | 0.88 |
| 195 | 1.17 | 0.75 | 0.80 |
| 205 | 1.15 | | 0.75 |
| 240 | 1.08 | | |
| 300 | 0.83 | | |
| 310 | 0.75 | | |

A flashlight operated with the improved cell glows more brightly and maintains its effective brightness for a longer time than flashlights operated with the present commercial type of cell.

Now, having fully described my invention, I claim the following as new and novel:

1. In a voltaic cell, a cathode assembly comprising a carbon electrode in contact with a compressed mixture of graphite, carbon black, p-toluene sulfonyl dichloramide, boric acid and a solution of sodium chloride.

2. A voltaic cell containing as a depolarizer an organic oxidizing substance in which the oxidizing properties are due to a group containing nitrogen attached to a halogen, such substance being selected from the group consisting of substitution derivatives of monochloramine and dichloramine.

3. A voltaic cell containing as a depolarizer paratoluene-sulfonyl dichloramide.

4. A voltaic cell containing as a depolarizer N-chlorphthalimide.

WILLIAM C. ARSEM.